United States Patent
Halepatali et al.

(10) Patent No.: US 10,094,093 B2
(45) Date of Patent: Oct. 9, 2018

(54) MACHINE ONBOARD ACTIVITY AND BEHAVIOR CLASSIFICATION

(71) Applicant: Caterpillar Inc., Peoria, IL (US)

(72) Inventors: Praveen Halepatali, Savoy, IL (US); Sang Kyum Kim, Champaign, IL (US); Meng Han, Savoy, IL (US); Nolan S. Finch, Champaign, IL (US); Vineet Agarwal, Chas (IN); Neil Moloney, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 256 days.

(21) Appl. No.: 14/942,338

(22) Filed: Nov. 16, 2015

(65) Prior Publication Data
US 2017/0138017 A1    May 18, 2017

(51) Int. Cl.
| | |
|---|---|
| *G01M 17/00* | (2006.01) |
| *G06F 7/00* | (2006.01) |
| *G06F 11/30* | (2006.01) |
| *G06F 19/00* | (2018.01) |
| *G07C 5/00* | (2006.01) |
| *E02F 9/26* | (2006.01) |
| *B60R 1/00* | (2006.01) |
| *G06K 9/00* | (2006.01) |
| *G06F 7/70* | (2006.01) |
| *G06G 7/00* | (2006.01) |
| *G06G 7/76* | (2006.01) |
| *E02F 3/32* | (2006.01) |

(52) U.S. Cl.
CPC ............... *E02F 9/26* (2013.01); *B60R 1/00* (2013.01); *E02F 9/261* (2013.01); *G06K 9/00718* (2013.01); *B60R 2300/80* (2013.01); *E02F 3/32* (2013.01)

(58) Field of Classification Search
CPC .... E02F 9/26; E02F 9/261; E02F 3/32; B60R 1/00
USPC .................................................. 701/29.1, 50
See application file for complete search history.

(56) References Cited

U.S. PATENT DOCUMENTS

| | | |
|---|---|---|
| 6,470,606 B1 | 10/2002 | Nagahiro et al. |
| 7,865,285 B2 | 1/2011 | Price et al. |
| 2007/0166144 A1 | 7/2007 | Hall |
| 2008/0005938 A1 | 1/2008 | Aebischer et al. |
| 2008/0162004 A1* | 7/2008 | Price .................. E02F 3/434 701/50 |
| 2011/0106384 A1 | 5/2011 | Aebischer et al. |

FOREIGN PATENT DOCUMENTS

WO    WO 2015169310 A1 *  11/2015  ......... G01C 21/3647

OTHER PUBLICATIONS

English Translation for WO2015169310A1.*

* cited by examiner

*Primary Examiner* — Mahmoud S Ismail
(74) *Attorney, Agent, or Firm* — Miller, Matthias & Hull

(57) ABSTRACT

A machine behavior classification system may include an electronic data collection system and an electronic data analysis system. The electronic data collection system may have an image capture apparatus that is configured to monitor a machine and the image capture apparatus may produce an image data file of the machine. Moreover, the electronic data analysis system may receive the image data file and may perform a data analysis of the image data file.

15 Claims, 6 Drawing Sheets

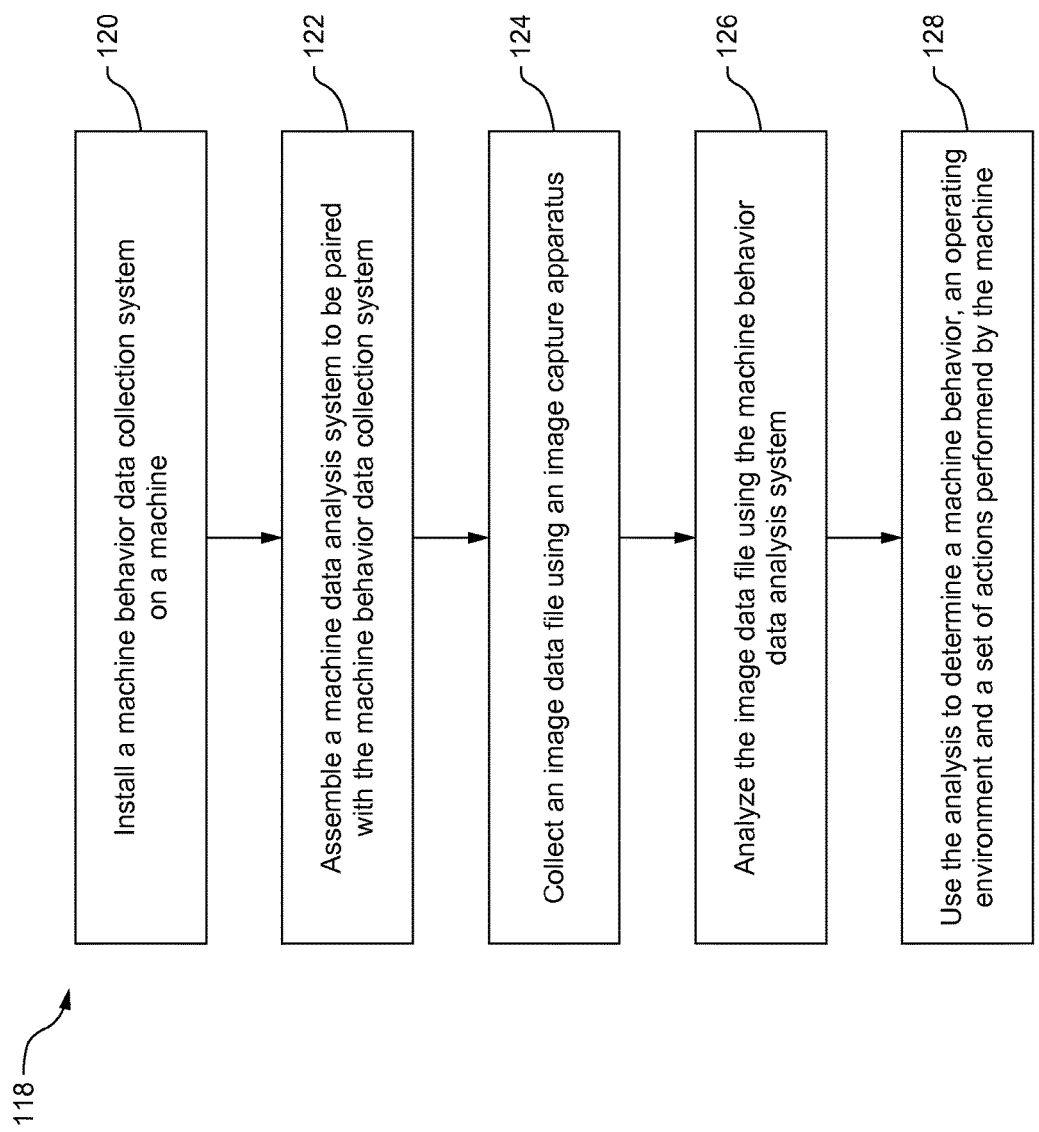

MACHINE ONBOARD ACTIVITY AND BEHAVIOR CLASSIFICATION

TECHNICAL FIELD

The present disclosure relates to machine behavior, and more specifically a system for monitoring onboard activity and behavior classification of machines.

BACKGROUND

Large machines, such as, excavators, backhoes, front-end loaders, bulldozers, dump trucks and other such machines, may be used to carry out an assortment of earthmoving tasks. Examples of such tasks may be, digging, grading, loading, unloading and transporting materials from one location to another, however other tasks are possible. In some cases, these large machines may be used at mining sites, construction sites, road building sites, or other such job sites. Moreover, due to the complexity of the tasks and expansive size of job sites, a number of machines may be required to work together to get the job done. For example, an excavator may be used to dig a hole and a load a dump truck with the material removed from the newly created hole, while the dump truck may then transport the material and dump it at a second location. In order to reach efficiency targets and maintain a safe job site, machine operators and job site supervisors may need to monitor and analyze machine activity and behavior. Moreover, at complex job sites with multiple machines working in a single area it can be increasingly difficult for the job site supervisors to monitor and track the progress of each machine.

During normal machine operation, the operators may sit or stand at a control terminal containing the machine controls and other machine instrumentation. For example, controls such as a steering wheel, a joystick, levers and pedals may allow the operator to direct the machine to perform an assortment of tasks, however other controls may be required to operate the machine. Moreover, the operator may use other instrumentation to help control and monitor the machine, such as, image, motion, temperature, orientation sensors or any other known sensors. These sensors may provide the operator with additional machine and environmental data that, when combined with the machine controls, allow the operator to better perform certain tasks and operations. Alternatively, with the additional sensor data it may be possible for the operator to control the machine remotely from another job site location or even from an off-site location.

In order to complete tasks in an efficient manner, the additional sensor data may be used to help monitor and analyze the machine activity and behavior by equipment operators, job site supervisors or other interested individuals. For example, a machine operator may have a partially obstructed view of job site while sitting in the cab of the machine and therefore may find it advantageous to use the sensor data to help keep track of what they are doing. Alternatively, or additionally, the job site supervisor may be able to use the sensor data to determine a rate at which work is being done, how long it takes to complete a certain task and the operational status of certain equipment, however other uses are possible. In so doing, the job site supervisor may further use this data to adequately plan out resource requirements to complete a specific job. Moreover, equipment operators and job site supervisors may be able to review the data and apply the results to maximize efficiency through better planning of machine movements.

One method and apparatus for determining the loading of a bucket is described in U.S. Patent Application Publication, US 2008/0005938 to Aebischer et al., ("the '938 application"). The '938 application discloses a method for determining the load of an excavator bucket. The application more particularly relates to a method for determining the position of a load surface in an excavator bucket using a distance measuring camera and the determination of a load volume from the position of the load surface combined with the position and shape of the bucket. In order to determine the position of the bucket the method disclosed in the '938 application requires obtaining a distance measurement of at least three points along the upper bucket edge using a camera. Furthermore, in the method disclosed by the '938 application a load volume is determined by using the position of the load surface combined with the position and shape of the bucket.

Among other things, the '938 method and apparatus fail to provide a system for monitoring and analyzing machine movement and overall behavior. Furthermore, the method and apparatus disclosed in the '938 application fails to provide a solution that works with equipment from different manufacturers. These and other shortcomings of the prior art are addressed by this disclosure.

SUMMARY OF THE DISCLOSURE

In accordance with one embodiment of the present disclosure, a machine behavior classification system is disclosed. The classification system may include an electronic data collection system and an electronic data analysis system. Furthermore, the electronic data collection system may include an image capture apparatus that may be configured to monitor a machine and the image capture apparatus may produce an image data file of the machine. Moreover, the electronic data analysis system may have a data analytics module that is configured to receive the image data file and the data analytics module may perform a data analysis of the image data file.

In accordance with another embodiment of the present disclosure, a machine is disclosed. The machine may have an engine and a tool movably attached to the machine. The machine may further have a machine behavior classification system operatively associated with the machine, the classification system having an electronic data collection system and an electronic data analysis system. Additionally, the electronic data collection system may have an image capture apparatus that is adjustably mounted on the machine. Moreover, the image capture apparatus may be configured to monitor a tool activity of the machine and an area surrounding the machine. Furthermore, the image capture apparatus may produce an image data file of the tool activity and the area surrounding the machine. Furthermore, the electronic data analysis system may include a data analytics module that is configured to receive and use the image data file and perform a data analysis of the image data file.

In yet another embodiment of the present disclosure, a method for monitoring a machine activity and providing a behavior classification is disclosed. The method may include creating a machine behavior classification system and the classification system may include an electronic data collection system and an electronic data analysis system. The method may further include installing the electronic data collection system on a machine at a job site and collecting an image data file using the electronic data collection system. Moreover, the method may further include the electronic data collection system having an image capture apparatus and the image capture apparatus may be configured to monitor a machine. Furthermore, the method may further include analyzing the image data file using the electronic data analysis system. The electronic data analysis system may have a data analytics module that is configured to receive and perform a data analysis of the image data file. Additionally, the method may further include determining a machine behavior, a machine operating environment and a set of actions performed by the machine through the data analysis of the image data file.

BRIEF DESCRIPTION OF THE DRAWINGS

FIG. 6 is a flow chart depicting a sample sequence of steps which may be practiced in accordance with an exemplary method employing the teachings of the present disclosure.

DETAILED DESCRIPTION

Figure 1:
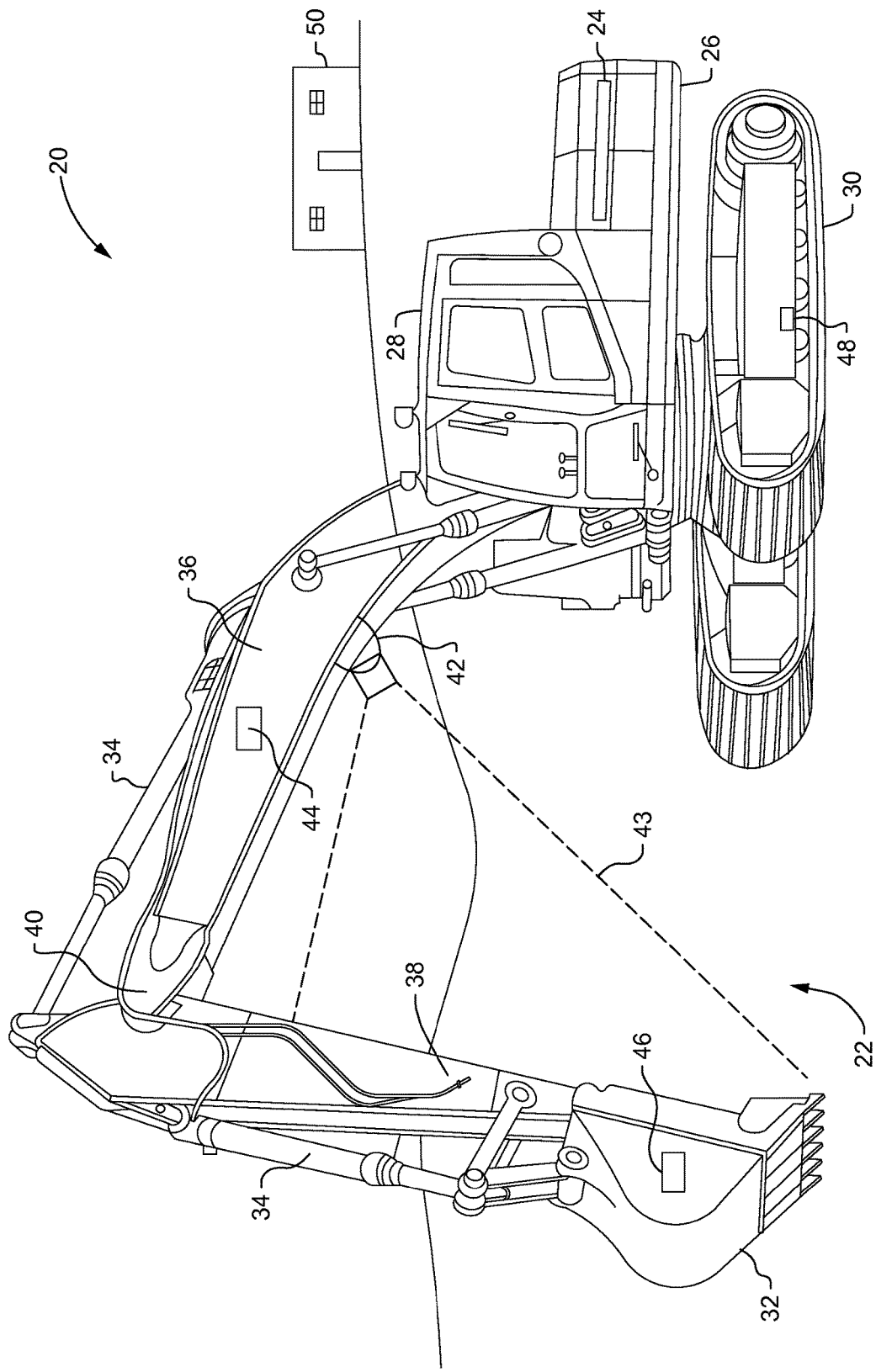
FIG. 1 is a perspective view of a machine incorporating the machine behavior classification system in accordance with an exemplary embodiment of the present disclosure.

Referring now to the drawings and with specific reference to FIG. 1, an exemplary embodiment of a machine constructed in accordance with the present disclosure is generally referred to by reference numeral 20. While one example is shown, the machine 20 may be any piece of equipment used at a job site 22, such as, excavators, off-road trucks, on-road trucks, bulldozers, backhoes, graders, loaders or other known pieces of equipment. Furthermore, while only one machine 20 is illustrated in FIG. 1, it may be possible for a plurality of machines 20, as well as a plurality of different types of machines 20, to work together or individually at the job site 22. In some embodiments, the machine 20 may have an engine 24, such as an internal combustion engine, a diesel engine, a natural gas engine, a hybrid engine or any combination thereof. Moreover, the machine 20 may be constructed as having a frame or body 26 which supports the engine 24 and in some embodiments, the engine 24 may be rigidly attached to the frame or body 26. Furthermore, the machine 20 may be configured with a cab 28 that is supported by the frame 26. In at least one non-limiting example, the cab 28 may be configured to provide a fully enclosed area for the operator to sit or stand in while operating the machine 20, however, other configurations of the cab 28 are possible. In order to provide mobility around the job site 22, the machine 20 may utilize a plurality of ground engaging elements 30, such as tracks, wheels or other known elements and the ground engaging elements 30 may be configured to allow movement of the machine 20.

In some embodiments, the machine 20 may be further configured with a tool 32 and one or more actuating elements 34 for raising, lowering or otherwise moving the tool 32. Furthermore, one non-limiting example of the machine 20 may have a boom 36 that is attached to the tool 32 and the actuating elements 34. The tool 32 may be a bucket, auger, blade, cutter, hammer, grapple, fork or any other known tool and in some embodiments, a plurality of tools 32 may be used to perform a task. Moreover, in some embodiments, the machine 20 may have a plurality of actuating elements 34 configured to move the boom 36, as well as provide the necessary actuation for the plurality of tools 32. Furthermore, in some embodiments, the tool 32 may be additionally, or alternatively, attached to an arm 38 and in one non-limiting example, the arm 38 is movably attached to the boom 36 at a joint 40. Furthermore, the boom 36 and arm 38 may both be attached to one or more actuating elements 34 and the actuating elements 34, along with the joint 40, may facilitate movement between the boom 36, tool 32 and arm 38. This movement may provide the boom 36, the arm 38 and the tool 32 the ability to do work and to complete the task or group of tasks at hand.

According to one embodiment, the machine 20 may include an imaging apparatus 42 such as, a digital video camera, a digital still camera or any other known imaging device and the imaging apparatus 42 may be adjustably attached to the machine 20. For example, the imaging apparatus 42 may be attached to the boom 36 or arm 38 of the machine 20 and adjusted to increase, decrease or otherwise optimize the field of view 43 of the imaging apparatus 42 in order to monitor the tool 32 and the surrounding area of the job site 22. Additionally, placement of the imaging apparatus 42 may be chosen such that the imaging apparatus 42 does not interfere with the normal operation and/or movement of the machine 20. In alternative embodiments, the imaging apparatus 42 may be attached to the cab 28, the frame 26, the tool 32 and/or any other suitable part of the machine 20. Moreover, in some embodiments a plurality of imaging apparatus 42 may be attached at various positions on the machine 20 and used to collect a plurality of different views of the machine 20, tool 32 and surrounding area of the job site 22. While FIG. 1 provides an illustration of mounting the imaging apparatus 42 on one exemplary machine 20 it will be appreciated that the imaging apparatus 42 may be used with other types of machines 20, such as, backhoes, front-end loaders, bulldozers, dump trucks and other such machines, and the placement of the imaging apparatus 42 may be optimized for each machine.

As a compliment to the imaging apparatus 42, some embodiments of the machine 20 may also have a plurality of sensors 44, 46 and 48 mounted on the machine 20. While FIG. 1 shows the use of three sensors, some embodiments of the machine 20 may incorporate a fewer or greater number of sensors. Moreover, the sensors 44, 46 and 48 may be temperature sensors, global positioning system (GPS) sensors, inertial measurements unit (IMU) sensors, such as, accelerometers, gyroscopes, magnetometers or any other desired sensor or combination thereof. Furthermore, in some embodiments, the imaging apparatus 42 may be used on a machine 20 that does not have any sensors 44, 46 and 48.

In one embodiment, the sensors 44, 46 and 48 may be mounted on the tool 32, the boom 36, the ground engaging elements 30, or any other useful location of the machine 20. Furthermore, the imaging apparatus 42 and sensors 44, 46 and 48 may be configured to work together in order to detect and/or monitor the activity and/or behavior of the machine 20. Some examples of activities detected and/or monitored by the imaging apparatus 42 and sensors 44, 46 and 48 may be dig, swing loaded, dump, swing empty, idle and moving. However, this list of machine actions to be monitored and identified is not exhaustive and monitoring other types of machines 20 and associated activities is possible. Moreover, the detection of machine activity by the imaging apparatus 42 and sensors 44, 46 and 48 may provide machine behavior data 49 that shows what activity or task the operator and machine 20 is doing, what rate the activity or task is being performed at, the amount of time an activity takes to complete or any other such metric of an activity or task. In some embodiments, the machine behavior data 49 may include an image data file produced by the imaging apparatus 42 and/or a sensor data file produced by the sensors 44, 46 and 48.

The imaging apparatus 42 and sensors 44, 46 and 48 may provide operational information or feedback about the machine 20 to the machine operator, the job site supervisor, an operator of another machine or any other interested personnel. Furthermore, the machine behavior data 49 collected from the imaging apparatus 42 and sensors 44, 46 and 48 may be transferred to an operations center 50 located at or in close proximity to the job site 22. Alternatively, or additionally, the machine behavior data 49 collected by the imaging apparatus 42 and sensors 44, 46 and 48 may be sent to an offsite location (not shown). In some embodiments, the machine behavior data 49 transferred to the operations center 50 may be used by the operator, the job site supervisor or any other interested personnel to monitor and track what the machine is doing.

Figure 2:
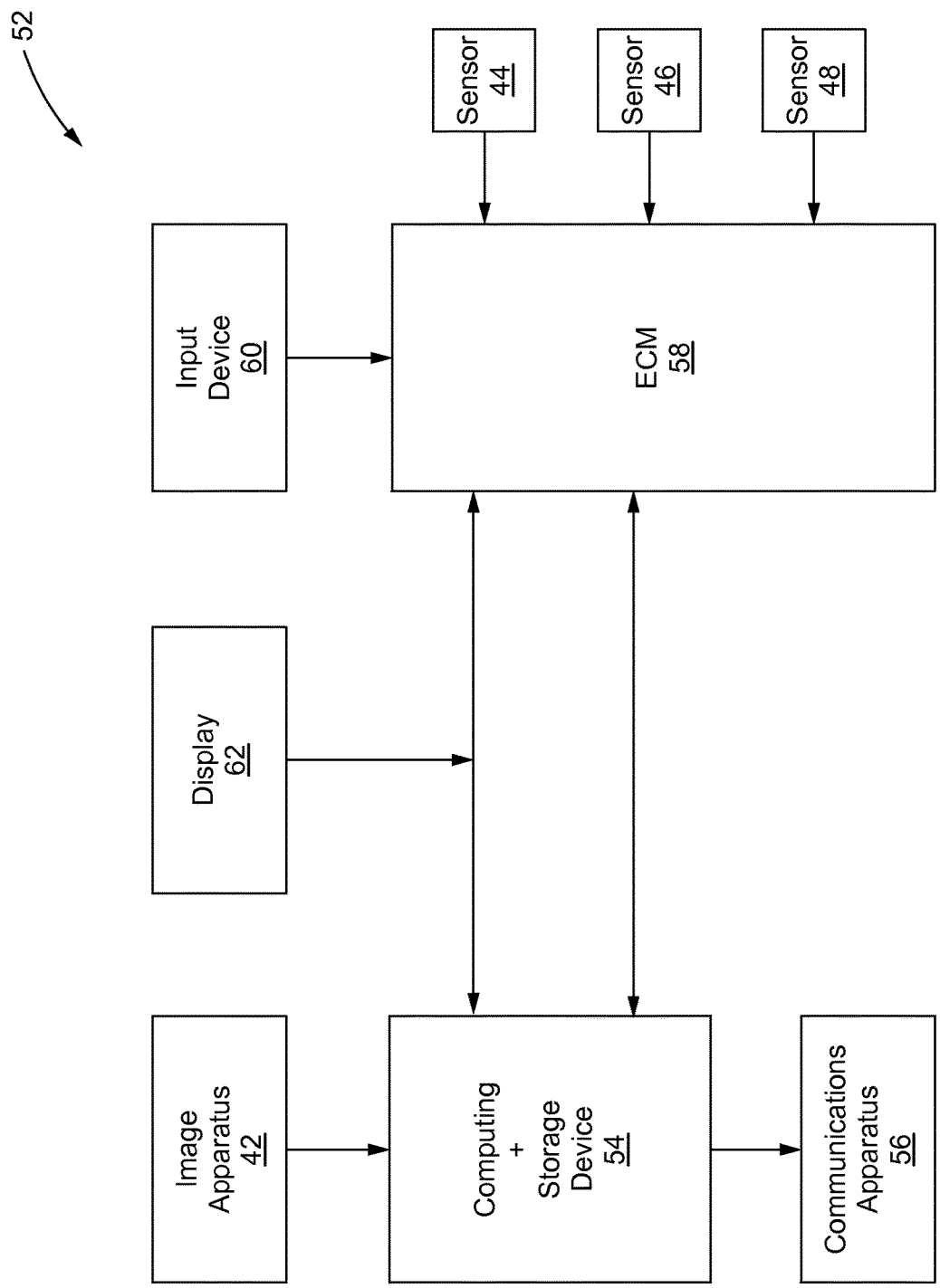
FIG. 2 is a block diagram of an exemplary embodiment of the machine behavior data collection system in accordance with the present disclosure.

FIG. 2 provides a block diagram of an exemplary set of components of a machine behavior data collection system 52 installed on the machine 20. In some embodiments, the machine behavior data collection system 52 may incorporate the imaging apparatus 42. The imaging apparatus 42 may be any known imaging device, such as, a digital video camera, a digital still camera or any other known device used to collect image data. In some embodiments, the imaging apparatus 42 may be configured to collect a continuous video file. Additionally, or alternatively, the imaging apparatus 42 may be configured to collect one or more still images. Moreover, the imaging apparatus 42 may be adjustably attached to the machine 20 and able to be adjusted by the machine operator or other user of the machine behavior data collection system 52. For example, the imaging apparatus 42 may be attached to the boom 36 or arm 38 of the machine 20 and adjusted to increase, decrease or otherwise optimize the field of view 43 of the imaging apparatus 42 in order to monitor the tool 32 and the surrounding job site area 22. In alternative embodiments, the imaging apparatus 42 may be attached to the cab 28, the frame 26, the tool 32 and/or any other suitable part of the machine 20. Moreover, in some embodiments a plurality of imaging apparatus 42 may be attached at various positions on the machine 20 and used to collect a plurality of different views of the machine, tool 32 and surrounding job site area 22.

In some embodiments, the imaging apparatus 42 may be connected to a computing and storage device 54. The computing and storage device 54 may be located inside the cab 28 of the machine 20 or in any other convenient location on the machine 20. In one non-limiting embodiment, the imaging apparatus 42 and the computing and storage device 54 may be communicably connected with each other in order to facilitate the transfer and/or sharing of the machine behavior data 49 between the imaging apparatus 42 and the computing and storage device 54. For example, the imaging apparatus 42 and computing and storage device 54 may be connected by a wired communications link (not shown), Bluetooth (not shown), near-field communication link (not shown), wireless computer network (e.g. Wi-Fi) (not shown), radio-frequency communication link (not shown), or any other known communication method. In some embodiments, the computing and storage device 54 is configured with a hard drive, flash drive, compact disc (CD), digital video disc (DVD) or other known storage media to store the image data collected by the imaging apparatus 42. Moreover, the computing and storage device 54 may be configured with software and/or hardware and the software and/or hardware may be used to control the imaging apparatus 42. Furthermore, the computing and storage device 54 may be connected to a communications apparatus 56 which is configured to send and/or receive machine behavior data 49 to the operations center 50, or other location, through a wired communication link (not shown), satellite data link (not shown), cellular data link (not shown), or other known communication method.

Furthermore, the machine 20 may have an electronic control module (ECM) 58 that the operator may use to help control and operate the machine 20. The ECM 58, may include, for example, an on-board computer with a processor for performing calculations, executing functions, and accessing machine information stored in a memory location. Additionally, in some embodiments the ECM 58 may be coupled to the computer and storage device 54 or alternatively, the ECM 58 may be integrated with the computer and storage device 54. Moreover, the ECM 58 may be coupled, to the imaging apparatus 42 and sensors 44, 46 and 48. In some embodiments, the ECM 58 may use the machine behavior data 49 that is acquired by the imaging apparatus 42 and sensors 44, 46 and 48 in performing calculations and executing functions. Likewise, in some cases the machine behavior data 49 collected by the imaging apparatus 42 and sensors 44, 46 and 48 may be stored in a memory location of the ECM 58 and/or the computer and storage device 54 such as, a hard drive, flash drive or other known storage media.

To assist the operator in operating the machine 20 the ECM 58 may be coupled to an operator input device 60 such as a touch screen, a touch pad, a keyboard, a button, a dial or any other suitable mechanism. Furthermore, the operator input device 60 may be directly or indirectly coupled to the computing and storage device 54 and the imaging apparatus 42. In some embodiments, the operator may use the input device 60 to select a function or operation to be performed by the ECM 58, the computing and storage device 54 and/or the imaging apparatus 42. Furthermore, the ECM 58 may be coupled to a display device 62, such as a liquid crystal display (LCD) monitor, a cathode ray tube (CRT) monitor or any other known type of display apparatus. In some embodiments, the operator input device 60 and the display device 62 may be integrated, for example, in the form of a touch screen monitor, tablet computing device, or other suitable device. Moreover, the display device 62 may be configured to readily provide information from the ECM 58, computing and storage device 54 and/or imaging apparatus 42 to the operator of the machine 20. In some embodiments, the information provided by the ECM 58 to the display device 62 may be a status of the machine 20, a list of machine functions available to the operator, a set of calculations of performed on machine behavior data 49 collected from the imaging apparatus 42 and sensors 44, 46 and 48 or other necessary information needed for operation of the machine 20.

Additionally, in some embodiments, the display device 62 may be coupled to the computer and storage device 54 and the imaging apparatus 42 and the display device 62 may be used by the operator to view images that are collected by the imaging apparatus 42. For example, the operator may be able to view a still image or a live video feed of the activity that is captured within the field of view 43 of the imaging apparatus 42. Furthermore, the operator may be able to view prior video and/or still camera images captured by the imaging apparatus 42. In some embodiments, the live video feed and/or still video or camera images may be stored in the memory of the computer and storage device 54 or any other known storage device. Moreover, the operator may be able to use the computer and storage device 54, the ECM 58 and the display device 62 to view machine behavior data 49 that was previously collected by the imaging apparatus 42.

In some embodiments, the operator input device 60 may allow the operator to control the imaging apparatus 42. For example, the operator may use the input device 60 to instruct the imaging apparatus 42 to start and/or stop collecting machine behavior data 49. Additionally, the input device 60 may allow the operator to adjust the field of view 43 and/or move the imaging apparatus 42 to monitor and collect machine behavior data 49 of another location of the machine 20 or surrounding area of the job site 22. Moreover, the imaging apparatus 42 may be configured with several adjustable parameters that the operator may control with the input device 60 or other input device. For example, the operator may be able to adjust the focus, zoom, light sensitivity, frame capture rate or any other available adjustment of the imaging apparatus 42.

Figure 3:
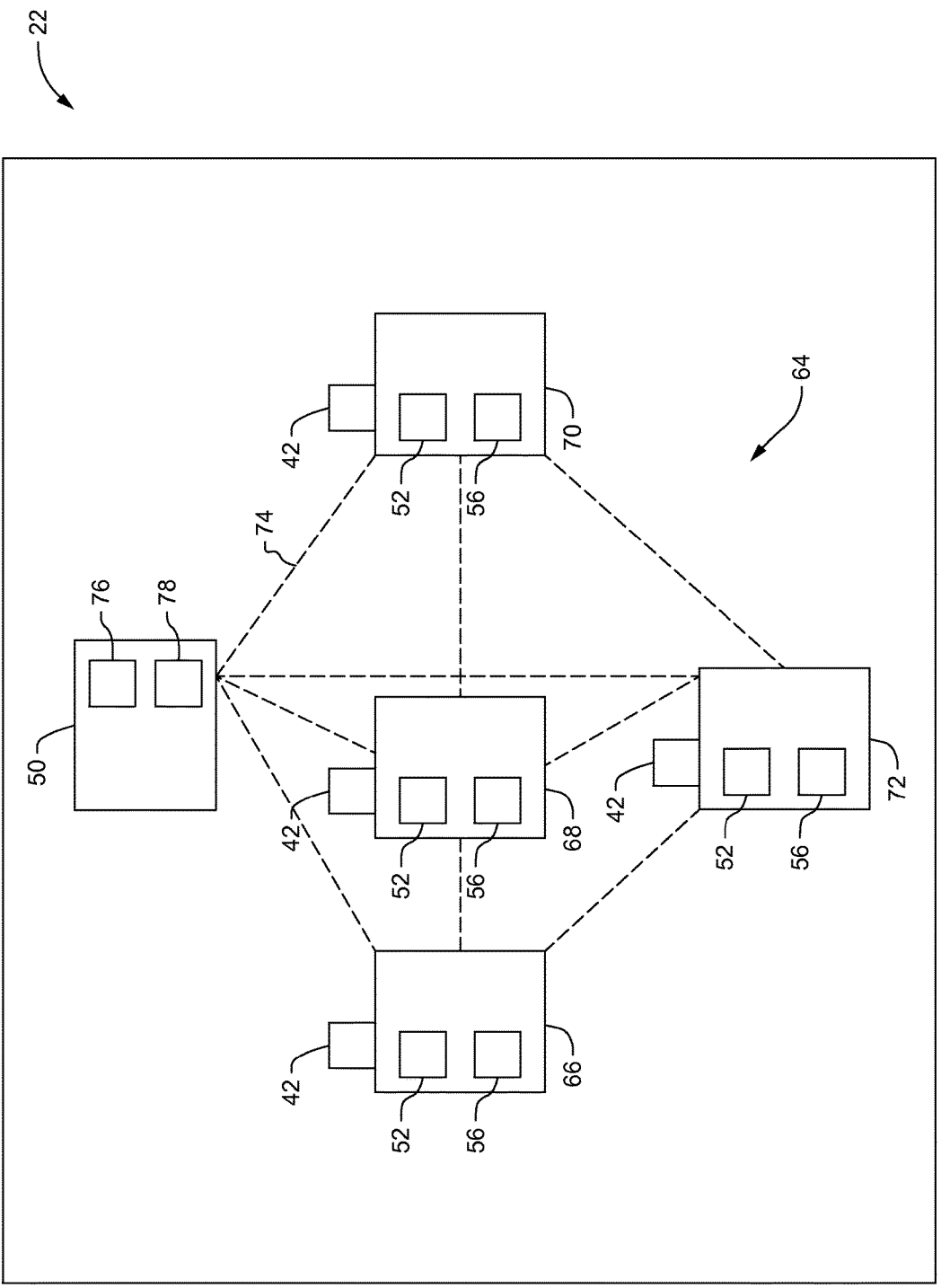
FIG. 3 is a schematic view of a fleet of machines in use at a job site in accordance with an exemplary embodiment the present disclosure.

FIG. 3 provides a schematic of a job site 22 layout consistent with one embodiment of the present disclosure. In some embodiments, the job site 22 may have a fleet 64 of machines 66, 68, 70, and 72 configured to perform tasks such as digging, hauling, dumping, moving earth, hoisting or other such operations. Moreover, the embodiment illustrated in FIG. 3 shows four machines 66, 68, 70, and 72 located at the job site 22, however fewer or greater numbers of machines may be used. Furthermore, the machines 66, 68, 70, and 72 may include similar elements as those discussed above with machine 20, however other elements may be included. In some situations, the fleet 64 may be composed of a single type of machine 20 and in other situations the fleet 64 may be composed of multiple types of machines 20 working at the job site 22. Moreover, machines 66, 68, 70, and 72 may be all sourced from a single manufacturer and have the machine behavior data collection system 52 installed as part of the manufacturing process. Alternatively, the machine behavior data collection system 52 may be installed on legacy machines that are already in use at the job site 22 or at another location. Furthermore, in some embodiments, it may be possible that machines 66, 68, 70, and 72 are sourced from one or more different manufacturers and the machine behavior data collection system 52 may be compatible with machines 66, 68, 70, and 72 from any manufacturer.

In one embodiment, the fleet 64 of machines 66, 68, 70, and 72 are each equipped with a machine behavior data collection system 52 that includes one or more imaging apparatus 42, as described above. Furthermore, machines 66, 68, 70, and 72 may each be equipped with the communication apparatus 56 coupled to the machine behavior data collection system 52, as described above. In some embodiments, each communication apparatus 56 may allow machines 66, 68, 70, and 72 to communicate and with each other over a communications network 74 set up on the job site 22. Moreover, the communications network 74 may be configured to allow machines 66, 68, 70, and 72 to send and receive data between one another. For example, image data collected from each imaging apparatus 42 may be viewed by each operator of machines 66, 68, 70 and 72. In some embodiments, the communication network 74 may allow communication through a satellite data network, a cellular data network, a computer data network, a Wi-Fi network, a radio frequency data network or any other known communication network.

Moreover, in some embodiments the communications network 74 may also be connected to an operations center 50 located somewhere on or near the job site 22. Alternatively or additionally, the communications network 74 may be connected to an off-site location (not shown) that is located a long distance away from the job site 22. In some embodiments, the operations center 50 may have a machine behavior electronic data analysis system 76 that is configured to analyze data collected by the machine behavior data collection system 52 installed on machines 66, 68, 70 and 72 or data collected from other sources. Moreover, in some embodiments the machine behavior electronic data analysis system 76 may have a communications apparatus 78 that is connected to the communications network 74 which may allow data to be sent/received between the machines 66, 68, 70, and 72 and the machine behavior electronic data analysis system located in the operations center 50.

In some embodiments, each machine 66, 68, 70, and 72 may be positioned at different locations of the job site 22. Moreover, the communications network 74 and the machine behavior data collection system 52 for each machine 66, 68, 70, and 72 may allow each operator to observe and monitor what each machine 66, 68, 70, and 72 is doing. For example, machine behavior data 49 collected by one of machine 66, 68, 70, and 72 may be viewed by each other machine 66, 68, 70, and 72 through sending/receiving the machine behavior data 49 over the communications network 74. Furthermore, the machine behavior data collection system 52 for each machine 66, 68, 70 and 72 may provide additional views of the job site 22 within the field of view 43 of the imaging apparatus 42 on each machine 66, 68, 70 and 72 to the other operators, the job site supervisor or any other individual with access to the communications network 74. Additionally, the machine behavior electronic data analysis system 76 may be able to view machine behavior data 49 collected by the imaging apparatus 42 located on each machine 66, 68, 70 and 72. As a result, the job site supervisor or other personnel may be able to track the progress of each machine 66, 68, 70 and 72 as well as obtain several views of the job site 22 through machine behavior data 49 collected from each imaging apparatus 42.

Figure 4:
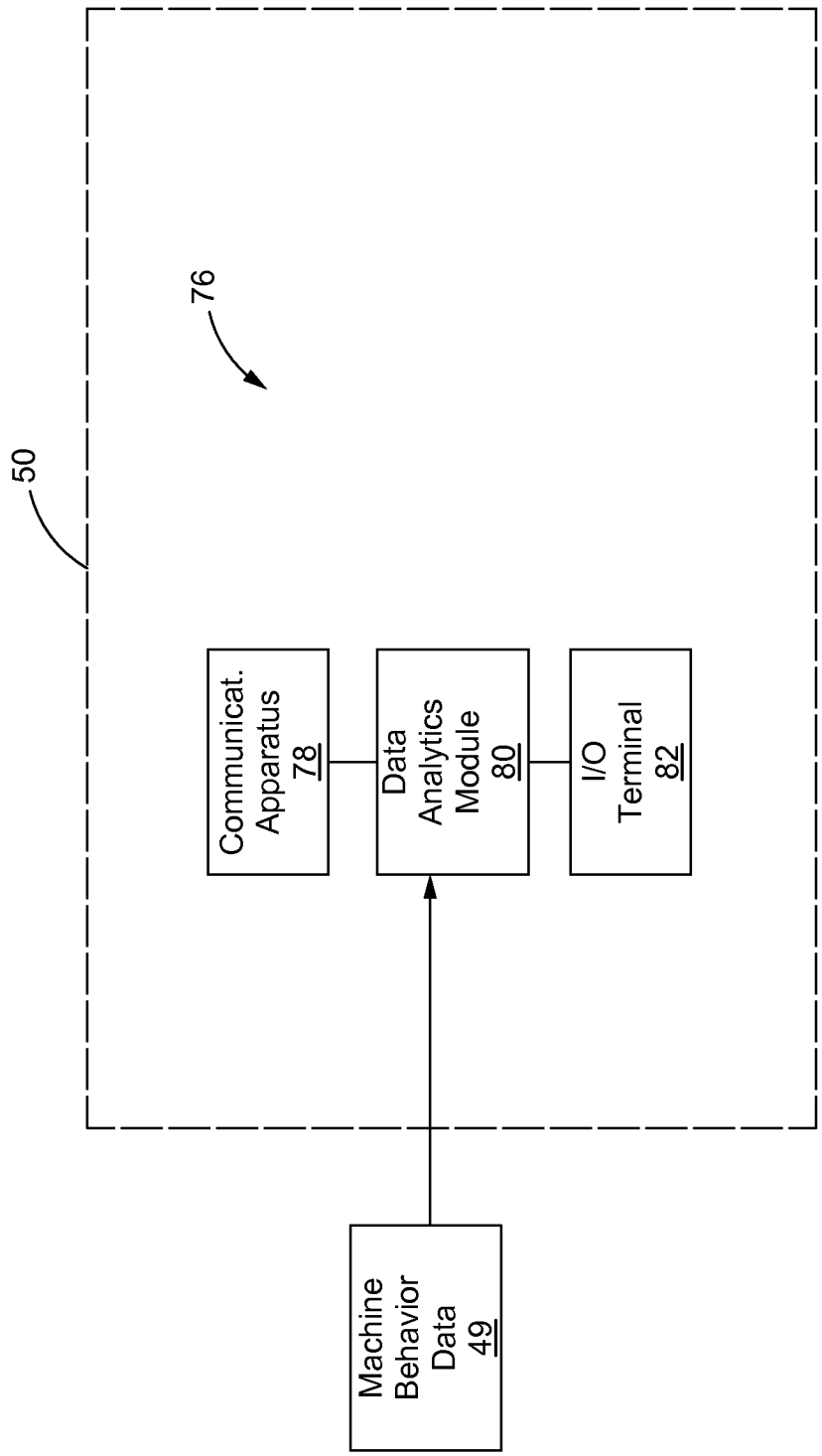
FIG. 4 is a schematic view of an exemplary embodiment of the machine behavior electronic data analysis system in accordance with the present disclosure.

FIG. 4 shows a schematic of a machine behavior electronic data analysis system 76 that may be configured to analyze machine behavior data 49 from the machine behavior data collection system 52 installed in machines 20, 66, 68, 70, and 72. Moreover, the machine behavior electronic data analysis system 76 may be configured to send and/or receive machine behavior data 49 or other instructions to and from machines 20, 66, 68, 70 and 72. In some embodiments, the machine behavior electronic data analysis system 76 is located on the job site 22 in the operations center 50 or at an off-site location (not shown). Additionally, or alternatively, the machine behavior electronic data analysis system 76 may be located on one or more of the machines 20, 66, 68, 70 and 72.

In some embodiments, the machine behavior electronic data analysis system 76 may include a communications apparatus 78, data analytics module 80, and an input/output terminal 82. The communications apparatus 78 may be coupled to the data analytics module 80 which is configured to send and/or receive machine behavior data 49 to machine 20, 66, 68, 70 and 72 or other piece of equipment located on the job site 22 or other location. Moreover, the communications apparatus 78 may connect the machine behavior electronic data analysis system 76 to the communications network 74 set up at the job site 22. The communication network 74 may facilitate communication between the machine behavior electronic data analysis system 76 and the machine behavior data collection system 52 installed on machines 20, 66, 68, 70 and 72 and communication may be transmitted through a satellite data network, a cellular data network, a computer data network, a Wi-Fi network, a radio frequency data network or any other known communication network.

A user of the machine behavior electronic data analysis system 76, such as an operator, a job site supervisor or other interested person, may rely upon the input/output terminal 82 to access the machine behavior electronic data analysis system 76. In some embodiments, the input/output terminal 82 may have one or more input devices (not shown) such as a keyboard, mouse, dial, button, touch screen, microphone or other known input device. Additionally, the input/output terminal 82 may have one or more output devices (not shown) such as, a monitor, speaker or other known output device. Furthermore, the input/output terminal 82 may allow the user to view data, input data, input commands, communicate with machines 20, 66, 68, 70 and 72 or perform other functions of the machine behavior electronic data analysis system 76.

In some embodiments, the data analytics module 80 is configured with a hard drive, flash drive, compact disc (CD), digital video disc (DVD) or other known storage media to store the machine behavior data 49 produced by the machine behavior electronic data analysis system 76. Furthermore, the data analytics module 80 may save data collected by the machine behavior data collection system 52. Moreover, the data analytics module 80 may be configured with software and hardware (not shown), such as a processor for performing calculations, executing functions and accessing machine information stored in a memory location.

Figure 5:
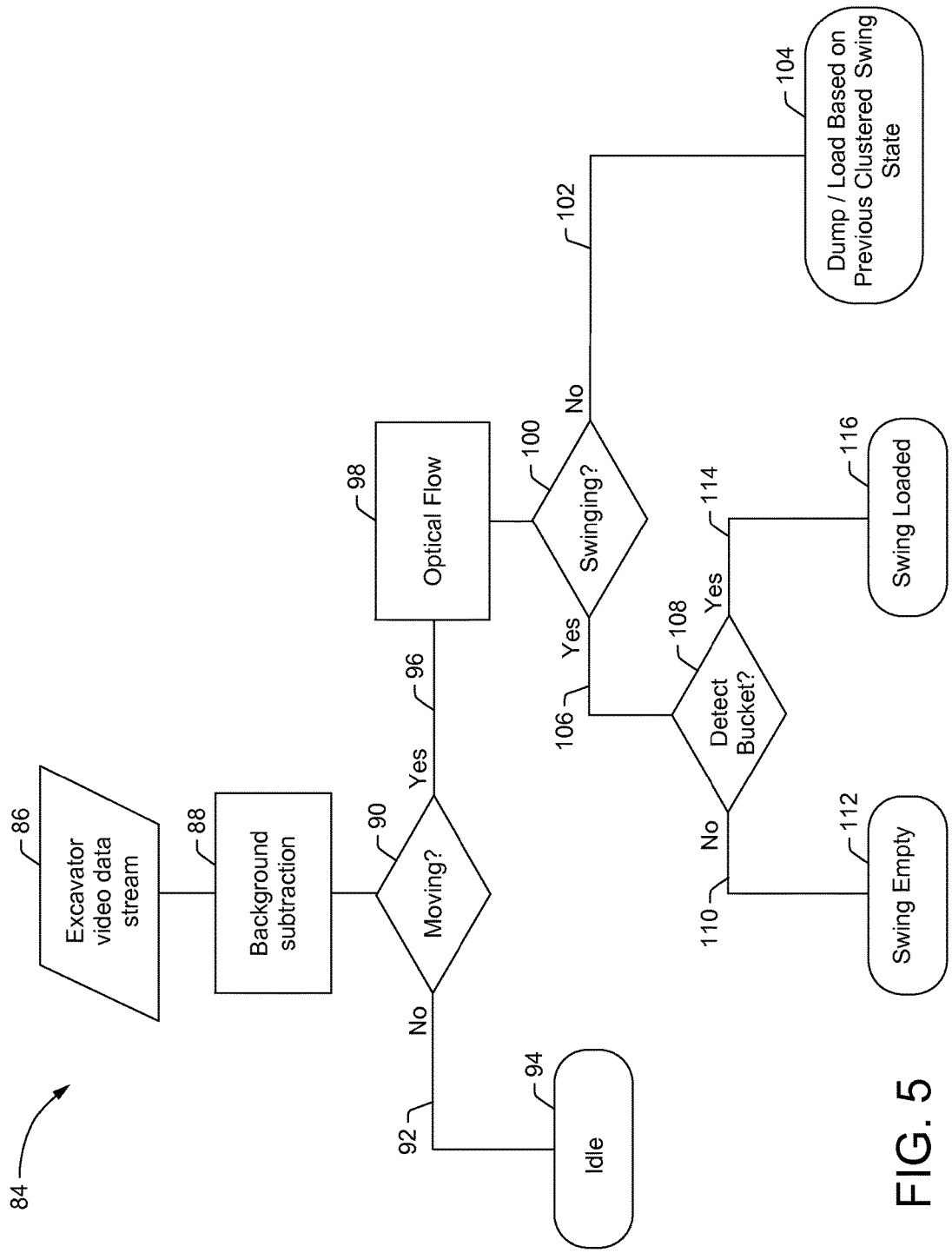
FIG. 5 is a process flow illustration of the machine and behavior classification analysis in accordance with an exemplary embodiment of the present disclosure.

FIG. 5 shows a diagram of an embodiment of an exemplary process flow 84 that may be used by the machine behavior classification system which is composed of the machine behavior data collection system 52 and the machine behavior electronic data analysis system 76. The process flow 84 may begin by the machine data collection system 52 sending a video data stream 86 from one or more of machines 20, 66, 68, 70 and 72. The video data stream 86 may be received by the machine behavior electronic data analysis system 76. Upon receiving the video data stream 86, the machine behavior electronic data analysis system 76 may first be configured to subtract the surrounding background 88. In some embodiments, the background subtraction 88 may be performed by software that is installed on the data analytics module 80 of the machine behavior electronic data analysis system 76. Moreover, the software may utilize an image recognition and analytics algorithm configured to detect certain machines 20, 66, 68, 70 and 72 elements, such as the tool 32, the boom 36, the arm 38 or any other machine element. The software may also be configured to retain the machine behavior data 49 related to the machine 20, 66, 68, 70 and 72 and the desired elements and subtract data of the surrounding environment and non-essential machine elements.

Following the background subtraction 88, the machine behavior electronic data analysis system 76 may make a determination whether machine 20, 66, 68, 70 and 72 is observed to be moving 90. If the machine behavior electronic data analysis system 76 determines machine 20, 66, 68, 70 and 72 is not moving 92, then machine behavior electronic data analysis system 76 may determine the machine 20, 66, 68, 70 and 72 is in an idle state 94. Moreover, if the machine behavior electronic data analysis system 76 makes a determination that the machine 20, 66, 68, 70 and 72 is moving 96 then the software of the machine behavior electronic data analysis system 76 may start a vision analytics algorithm that performs an optical flow analysis 98 of the video data stream 86. For example, the video data stream 86 may be a sequence of frames or images of the machine 20 captured over a specified time and the optical flow analysis 98 may analyze the each frame of the video data stream 86 in order to detect any apparent motion that may be observed at a point between each frame.

In some embodiments, the first part of the optical flow analysis 98 may be to determine whether the machine 20, 66, 68, 70 and 72 is swinging 100 the boom 36, arm 38 and/or tool 32. If the optical flow analysis 98 determines that the machine 20, 66, 68, 70 and 72 is not swinging 102 then the optical flow analysis 98 may determine that the machine 20, 66, 68, 70, and 72 has either dumped its load or is picking up a load based on the previous clustered swing state 104. On the other hand, if the optical flow analysis 98 determines the machine 20, 66, 68, 70 and 72 is swinging 106, then the optical flow analysis 98 looks to detect the tool 32 (e.g. bucket) 108. In some embodiments, if the tool 32 is not detected 110, the swing may be determined to be empty 112. However, if it the tool 32 is detected 114, then the swing may be determined to be loaded 116. The exemplary process flow 84 described above may be tailored to a machine behavior data collection system 52 installed on a specific machine type. It will be appreciated that the machine behavior data collection system 52 and the machine behavior data analysis system 76 are compatible with a plurality of different machine types, such as, excavators, backhoes, front-end loaders, bulldozers, dump trucks and other such machines. As such, the process flow 84 may be modified to capture and analyze a plurality of different behaviors of the different machines.

INDUSTRIAL APPLICABILITY

In general, the disclosed machine activity and behavior classification system of the present disclosure may find applicability in many industries, including but not limited to, the analysis and optimization of operations of machines that are used in the earth moving, mining, agricultural and construction industries. Such an activity and behavior classification system may be configured to be compatible with a wide range of industrial machines such as, excavators, backhoes, front-end loaders, bulldozers, dump trucks and other such machines. Furthermore, the activity and behavior classification system of the present disclosure may be compatible with new machines as well as legacy machines already in use in the field. More specifically, the activity and behavior classification system may be designed such that it may be used on machines that come from different manufacturers. One non-limiting example of a machine classification method using the activity and behavior classification system is described below.

Referring to FIG. 6, an exemplary flowchart is illustrated describing a method 118 which may be followed to monitor and classify the activity and behavior of the machine 20, as described in the present disclosure. The first step 120 of the method 118 may require installing a machine behavior data collection system 52, the machine behavior data collection system 52 having an imaging apparatus 42 that may be mounted on the machine 20, a computer and storage device 54 and a communications apparatus 56. The imaging apparatus 42 may be configured to monitor and capture the actions and movement of the machine 20. In some embodiments, the machine behavior data collection system 52 may additionally be coupled to one or more sensors 44, 46 and 48 mounted on the machine 20.

According to the next step 122 of method 118, a machine behavior electronic data analysis system 76 may be assembled and paired with the machine behavior data collection system 52. Moreover, in some embodiments, the machine behavior electronic data analysis system 76 may be housed in an operations center 50 that is located somewhere on the job site 22 or at an off-site location. Furthermore, the machine behavior electronic data analysis system may have a data analytics module 80 and a communications apparatus 78. In some embodiments, the communications apparatus 78 may allow the machine behavior electronic data analysis system 76 to communicate with the machine 20 and the machine behavior data collection system 52.

In a step 124, machine behavior data 49 may be collected by the imaging apparatus 42 and sensors 44, 46, 48. In one non-limiting embodiment, the machine behavior data 49 collected by the imaging apparatus 42 and sensors 44, 46, 48 may be saved to the computer and storage device 54 of the machine behavior data collection system 52. Additionally, or alternatively, in some embodiments, the communications apparatus 56 of the machine behavior data collection system 52 may transmit the machine behavior data 49 to the communications apparatus 78 of the machine behavior electronic analysis system 76.

The next step 126 of method 118 may provide that the machine behavior data 49 file received by the machine behavior electronic data analysis system 76 is analyzed by the data analytics module 80. In some embodiments, the machine behavior data 49 file may provide an image data file or video data stream 86 of the machine 20 and surrounding job site 22. Moreover, the data analytics module 80 may use object detection and optical flow analysis 98 during the analysis of the data file. Furthermore, according to the final step 128, the object detection and optical flow analysis 98 may be used to recognize various behavior states of the machine 20. In some embodiments, the analysis may be further used to determine a behavior of the machine 20, an operating environment or job site 22 surrounding and a set of actions that are performed by the machine. As a result of the analysis, certain metrics may be determined that may allow for the optimization of machine 20.

It will be appreciated that the detection and monitoring of machine activity is difficult and often requires the use of multiple sensors. Furthermore, it is common practice that a mix of different types of equipment, often from different manufacturers, may be utilized at large job sites. This diversity of the equipment fleet can add to the difficulty of providing a system to monitor machine activity and behavior. As a result, an improved machine behavior analysis and optimization system is needed that is compatible with all pieces of equipment in use at a job site.

It will be apparent to those skilled in the art that various modifications and variations can be made to the disclosed machine activity and behavior classification system. Other embodiments will be apparent to those skilled in the art from consideration of the specification and practice of the disclosed method and classification system. It is intended that the specification and examples be considered as exemplary only, with a true scope being indicated by the following claims and their equivalents.

What is claimed is:

1. A machine behavior classification system, the classification system comprising:
   an electronic data collection system including a digital video camera mounted on a machine and configured to collect a continuous video file including a plurality of video frames, and the digital video camera is further configured to generate a video data file based off the continuous video file;
   a computing and storage device communicably coupled to the digital video camera and the video data file transmitted to the computing and storage device for storage of the video data file; and
   an electronic data analysis system including a data analytics module communicably coupled to the computing and storage device and configured to receive the video data file, wherein the data analytics module is programmed to execute a background subtraction on the video data file, and wherein the data analytics module is further programmed to execute an optical flow analysis following the background subtraction on the video data file to analyze each video frame of the plurality of video frames included in the video data file.

2. The machine behavior classification system of claim 1, wherein the optical flow analysis executed by the data analytics module analyzes the video data file to detect an apparent motion observed at a point between each video frame of the plurality of video frames.

3. The machine behavior classification system of claim 1, wherein the electronic data collection system is communicably coupled to a first communication apparatus and the electronic data analysis system is communicably coupled to a second communication apparatus, and wherein the first communication apparatus sends the video data file to the second communication apparatus such that the electronic data analysis system receives the video data file.

4. The machine behavior classification system of claim 3, wherein the first communication apparatus and the second communication apparatus to create a live video stream between the electronic data collection system and the electronic data analysis system, the live video stream being viewable by a user of the electronic data collection system and the electronic data analysis system.

5. The machine behavior classification system of claim 3, wherein the electronic data collection system is operably connected to a plurality of sensors located on the machine, and wherein the plurality of sensors create a sensor data file, and wherein the first communication apparatus is configured to send the sensor data file to the second communication apparatus and the data analytics module uses the sensor data file and the video data file to perform the data analysis.

6. The machine behavior classification system of claim 1, wherein the digital video camera has an adjustable field of view and the field of view can be adjusted remotely by a user of the machine behavior classification system.

7. The machine behavior classification system of claim 1, wherein the machine behavior classification system is used to optimize an operation of the machine or a fleet of machines working at a job site.

8. A machine, comprising:
   an engine;
   a tool movably attached to the machine;
   a machine behavior classification system comprising:
     an electronic data collection system including a digital video camera mounted on the machine and configured to collect a continuous video file including a plurality of video frames and the digital video camera is further configured to generate a video data file based off the continuous video file;

a computing and storage device communicably coupled to the digital video camera, and the video data file is transmitted to the computing and storage device to store and save the video data file; and an electronic data analysis system including a data analytics module communicably coupled to the computing and storage device and configured to receive the video data file, wherein the data analytics module is programmed to execute a background subtraction on the video data file, and wherein the data analytics module is further programmed to execute an optical flow analysis following the background subtraction to analyze each video frame of the plurality of video frames included in the video data file to determine a plurality of operational states of the machine.

9. The machine of claim 8, wherein the optical flow analysis executed by the data analytics module analyzes the video data file to detect an apparent motion observed at a point between each video frame of the plurality of video frames, and wherein at least one operational state of the plurality of operational states of the machine is determined as a swing state using the tool.

10. The machine of claim 8, wherein a video monitor and a control module are located in an operator compartment of the machine, the digital video camera and the computing device are coupled to the video monitor and configured to display the video data file on the video monitor and the electronic data collection system is operatively coupled to the control module and the control module is used to operate the electronic data collection system.

11. The machine of claim 8, wherein the electronic data analysis system is located at a distance away from the machine, the electronic data collection system being communicably coupled to a first communication apparatus and the electronic data analysis system being communicably coupled to a second communication apparatus, and wherein the first communication apparatus sends the video data file to the second communication apparatus.

12. The machine of claim 11, wherein the electronic data collection system is operably connected to a plurality of sensors located on the machine, and wherein the plurality of sensors create a sensor data file, and wherein the first communication apparatus is configured to send the sensor data file to the second communication apparatus and the data analytics module uses the sensor data file and the video data file to perform the data analysis.

13. The machine of claim 10, wherein the image capture apparatus has an adjustable field of view configured to increase or decrease the surrounding area of the machine viewed by the digital video camera and the adjustable field of view is controlled remotely by a user of the machine behavior classification system.

14. The machine of claim 8, wherein the machine behavior classification system is used to optimize an operation of the machine or a fleet of machines working at a job site.

15. The machine of claim 14, wherein the job site has a communications network, the fleet of machines working at the job site each having the electronic data collection system, the fleet of machines using the communications network to share a sensor data file and the image data file collected by the electronic data collection system of each machine in the fleet of machines.

* * * * *